United States Patent [19]

Sander et al.

[11] 4,236,630

[45] Dec. 2, 1980

[54] EXTENSIBLE TELESCOPIC COAL BUNKER FOR SUBSURFACE MINING

[75] Inventors: Günter Sander, Bottrop; Roland Günther, Wesel, both of Fed. Rep. of Germany

[73] Assignee: Gutehoffnungshütte Sterkrade Aktiengesellschaft, Oberhausen, Fed. Rep. of Germany

[21] Appl. No.: 943,975

[22] Filed: Sep. 20, 1978

Related U.S. Application Data

[63] Continuation-in-part of Ser. No. 803,255, Jun. 3, 1977, abandoned.

[30] Foreign Application Priority Data

Jun. 12, 1976 [DE] Fed. Rep. of Germany ....... 2626408

[51] Int. Cl.³ ............................................... B65G 3/04
[52] U.S. Cl. .................................... 198/577; 198/560; 414/323; 414/325
[58] Field of Search ............... 414/296, 304, 323, 325, 414/509–517, 522; 198/550, 560, 575, 577, 616

[56] References Cited

U.S. PATENT DOCUMENTS

| 1,794,318 | 2/1931 | Perkins et al. ............... 414/512 X |
| 3,349,931 | 10/1967 | Wagner ............................ 414/512 |

FOREIGN PATENT DOCUMENTS 402662  12/1966  Australia .................................. 198/577

*Primary Examiner*—Robert G. Sheridan
*Attorney, Agent, or Firm*—Toren, McGeady and Stanger

[57] ABSTRACT

A subsurface coal bunker operating to receive and discharge coal is structured with an assemblage of nested telescopic container members including one stationary member and a plurality of movable members, with the container members being formed in size in a graduated series with each container member being sized to fit into a next larger container member adjacent thereto. The movable members are telescopically extensible and contractible in order to vary the volume of the assemblage and the bunker assembly is provided with a first belt conveyor for feeding material into the assemblage and a second belt conveyor for transporting material therefrom. A reversible drive mechanism, consisting of hydraulic cylinder devices actuating a system of drive chains and pulleys, is mounted on a support frame of the bunker and operates to drive the movable members between the extended and contracted positions.

11 Claims, 10 Drawing Figures

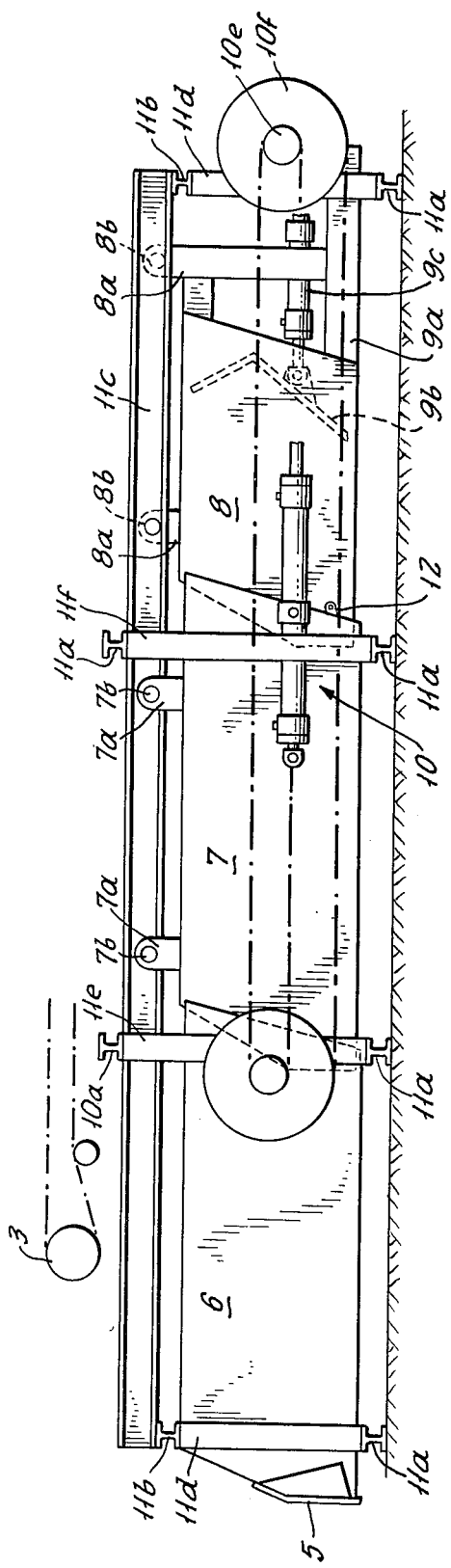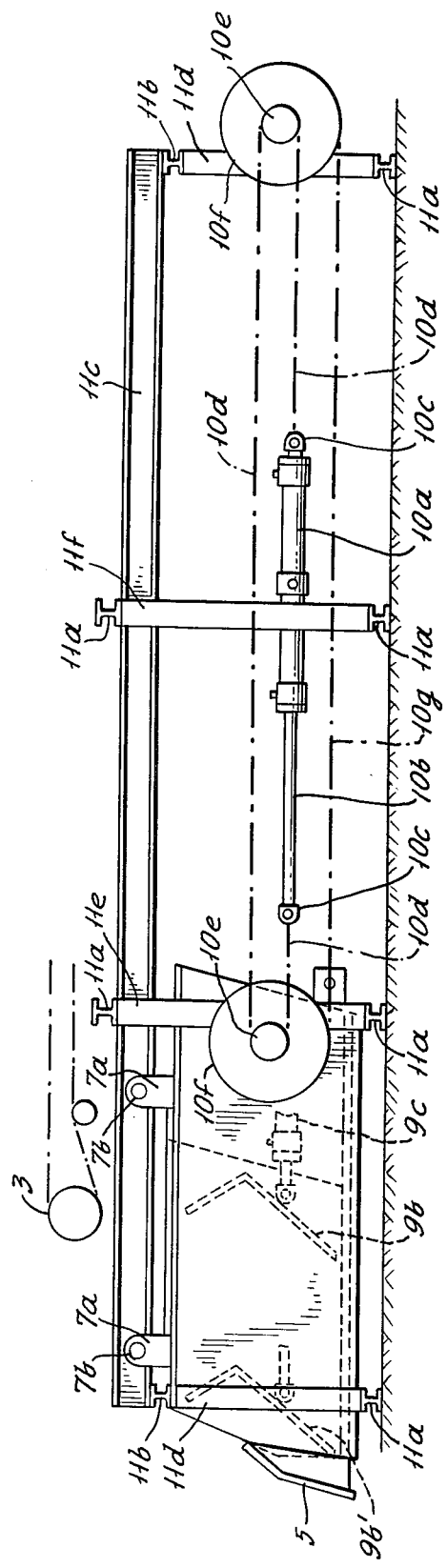

4,236,630

EXTENSIBLE TELESCOPIC COAL BUNKER FOR SUBSURFACE MINING

This application is a continuation-in-part of application Ser. No. 803,255 filed June 3, 1977, now abandoned.

BACKGROUND OF THE INVENTION

The present invention relates generally to apparatus used in connection with coal mining and more particularly to a bunker having a given storage capacity adaptable for utilization to have bulk materials such as coal fed thereinto and discharged therefrom. The bunker of the present invention is particularly suitable for use in subsurface mine hauling and is of the type which operates to have its volume varied by contraction and expansion of the bunker or container.

Horizontally arranged extensible bunkers which operate to receive and discharge bulk materials and which include means to compensate for temporary fluctuations in the delivery and withdrawal rates of the device are known in the prior art. The commercial utility and economic desirability of extensible bunkers relies to a great extent upon the storage capacity of such bunkers as well as the overall cost per cubic meter of the bunker. Such costs tend to be especially high in installations where the bunker volume is less than about 100 m$^3$.

However, in the case of extensible bunkers of limited storage capacity there develops a rapidly increasing demand especially where the seam and run-of-mine coal are on the same level and where, as a result, a blind shaft spiral cannot be fitted ahead as a buffer. Additionally, the same situation arises in drift work for the stowing of the heap or pile of materials which has been extracted which may then be hauled away at a later time and in proportioned amounts. Furthermore, smaller bunkers tend to have a greater inclination to develop bridging or arching and to reducing the size of the coal in larger bunkers.

Mechanical discharge devices which are utilized in the bottoms of smaller bunkers are more susceptible than those utilized with larger installations to the shifting of the supporting structure which may occur as a result of expansion or swelling of the mine floor.

Removal or trickle or leakage passing between the bottom and the transport means may cause disproportionately higher costs for smaller extensible bunkers than for larger bunkers.

Many of the disadvantages which arise with prior art devices involving extensible bunkers of limited storage capacity may be avoided mainly by improving the discharge capabilities of the bulk material. With known extensible bunkers, the discharge is effected by chain scraper conveyors or plate conveyors.

In German No. DT-AS1235841 a device for unloading a transport container is described which, after certain changes have been effected could find use additionally as an extensible bunker. The evacuation of such a container is effected by pushers in stepped arrangement one above the other which are actuated by hydraulic cylinders.

The use of such a device in connection with extensible bunkers is, of course, prohibited when coal is involved because it would result in intensive relative movement within the bulk material and cause undesirable crumbling of the coal. The cost of machinery for a design according to the aforementioned German DT-AS is higher than for the known extensible bunkers in relation to the available storage capacity and attainable output.

Additionally, the evacuation of a container as is illustrated in, for example, German No. DT-AS1054377, by means of a trough conveyor in the bottom thereof having a plurality of pivotal bottom flaps is unsuitable in an extensible bunker because of the disintegration of the coal which will occur in the trough conveyor. Furthermore, problems arise because of the insufficient cross-section of the bottom flaps for material which may involve large lumps and because of the high percentage of trickle or leakage which is to be expected.

It is an object of the present invention to provide an extensible bunker where there is involved the transport of small quantities of material and more specifically where a bunker volume of preferably less than 100 m$^3$ is involved. The invention is directed toward enabling redesigning and developing of known extensible bunkers thereby avoiding the aforementioned disadvantages and to a large extent to obtaining additional advantages over the presently known art.

SUMMARY OF THE INVENTION

Briefly the present invention may be described as a bunker assembly for receiving and discharging bulk materials, particularly coal for subsurface mine hauling, comprising an assemblage of nested telescopic container members including one stationary member and a plurality of movable members, with the container members being formed in size as a graduated series with each container member being sized to fit into a next larger adjacent container member. The movable container members are telescopically movable relative to the stationary member and to each other in order to enable expansion and contraction of the volume of the assemblage. Means are provided for feeding material into the container assemblage and means are also provided for discharging material therefrom. The feeding and discharge means may comprise belt conveyors, one located above the container assemblage for feeding coal thereinto and the other located below the assemblage for withdrawing coal therefrom.

The movable containers include an end container member which is located at the furthest point from the stationary member when the movable members are in there fully extended position. The stationary container member includes an unloading flap through which bulk material may be discharged from the assemblage. The assemblage includes discharge means in the form of an end wall of the end container member, with the end wall being capable of actuation to push or propel bulk material within the container members toward the stationary member and through the unloading flap onto the discharge belt conveyor.

Drive means are provided for moving the container members in order to expand and contract the volume of the bunker and means are also provided for moving the end wall of the end container member when bulk material is to be received into and discharged from the bunker.

In accordance with the invention, the extensible bunker should be compact and it should be capable of being accommodated for use in the ordinary coal drift profile or heap. The bulk material should be easily charged by belt conveyors into the bunker and conveniently removed therefrom. In the feed-out operation, a minimum of trickle is to be produced and the bulk coal should be treated as gently as possible. The extensible bunker should require a minimum of manufacturing costs and it should operate with simple, wear resistant actuating devices. Furthermore, the device of the present invention should not be effected by enlargement of the mine floor, it should avoid bridging of the bulk material and it is adaptable to be located as may be required without great expense. Furthermore, the invention is easy to operate, it is not trouble-prone, and the various parts thereof are generally accessible with ease for maintenance and repair.

Filling of the bunker with the bulk material is effected by the belt conveyor which is disposed directly above the container members and the device is arranged so that the height of the fall of the coal or bulk material from the conveyor into the bunker is small in order to minimize the impact of the material. Additionally, hauling away of the bulk material is accomplished by a belt conveyor under circumstances effecting maximum care in the loading and transportation of the material. This is made possible in that the bulk material may be fed by the belt conveyor into the successively extractable movable containers therebelow and then finally moved into the stationary container member from where it may be transported upon the discharging belt conveyor located below the stationary container member.

The invention is directed toward enabling the bulk material to be treated in a manner which will cause the least possible jarring in order to avoid as much as possible crumbling of the material. This objective is achieved with the invention by providing the shifting device or actuating member which operates as the end wall of the end container member by means of which the bulk material may be pushed or propelled into the stationary container member as the movable containers are being telescopically nested to contract the volume of the bunker. The movable end wall of the end container member thus propels the bulk material through the unloading flap formed in the stationary container member from which it is deposited upon the discharging belt conveyor.

Pushing of the bulk material out of the stationary container member through the unloading flap by the displaceable wall of the end container member is effected by a shifting or actuating member located adjacent the movable end container member. The extensible bunker is mounted in a compact frame structure which is easily installed and easily relocated and which is generally insensitive to expansion or swelling of the mine floor. Thus there is permitted easy operation with low wear of the movable parts. In accordance with another feature of the invention ease of operation is achieved in that the stationary container member and the movable container members are mounted in the frame structure with the movable members being suspended therefrom by pivot mounts which allow the container members to be displaced along the frame structure upon roller guides.

In order to avoid trickle or leakage and for undisturbed input and discharge of the bulk material, the displacement zone of the movable container members of the bunker is clearly defined and limited.

In accordance with the invention, this is achieved in that the movable containers are provided with ratchet elements by means of which they may be detached from one another when they are moved in the contracting direction and connected with one another when they are moved in the expanding direction so that they may be telescoped into and out of the profile of the stationary container.

Of course, variations in the mounting of the telescoping movable containers is possible. For example, the containers may be moved toward the contracting and expanding positions by supporting the movable containers upon rollers or by guiding them within slide rails. In order to enable utilization of the full storage capacity of the expandable bunker, a mechanical drive mechanism is provided for shifting the container members. In accordance with the present invention, the drive mechanism includes a hydraulic cylinder mechanism comprising a pair of hydraulic cylinders mounted on the frame means on opposite sides of the bunker. By operation of the hydraulic cylinders, the movable container members may be pushed into or pulled out of the stationary container member through mechanical means such as cable means or chain drive means. Friction wheel drives, or rack or lantern gear drives may also be utilized. The capacity of the bunker may be fully utilized if the operation of delivering the material to the bunker, placing the material into the bunker, retaining the material and discharging it and transporting it away from the bunker are performed with control and synchronization of the time factors involved and of the quantity of material being transported. In the present invention, the drive mechanisms of the belt conveyors, the actuating mechanisms of the unloading flap and the drive means for the movable containers may be operated in a controlled sequence by means of control and locking devices.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 6 is a side elevation of the assembly as shown in FIG. 5;

FIG. 7 is a side elevation of the assembly shown in FIG. 6 with the movable container members in their contracted positions;

DETAILED DESCRIPTION OF THE PREFERRED EMBODIMENTS

Figure 1:
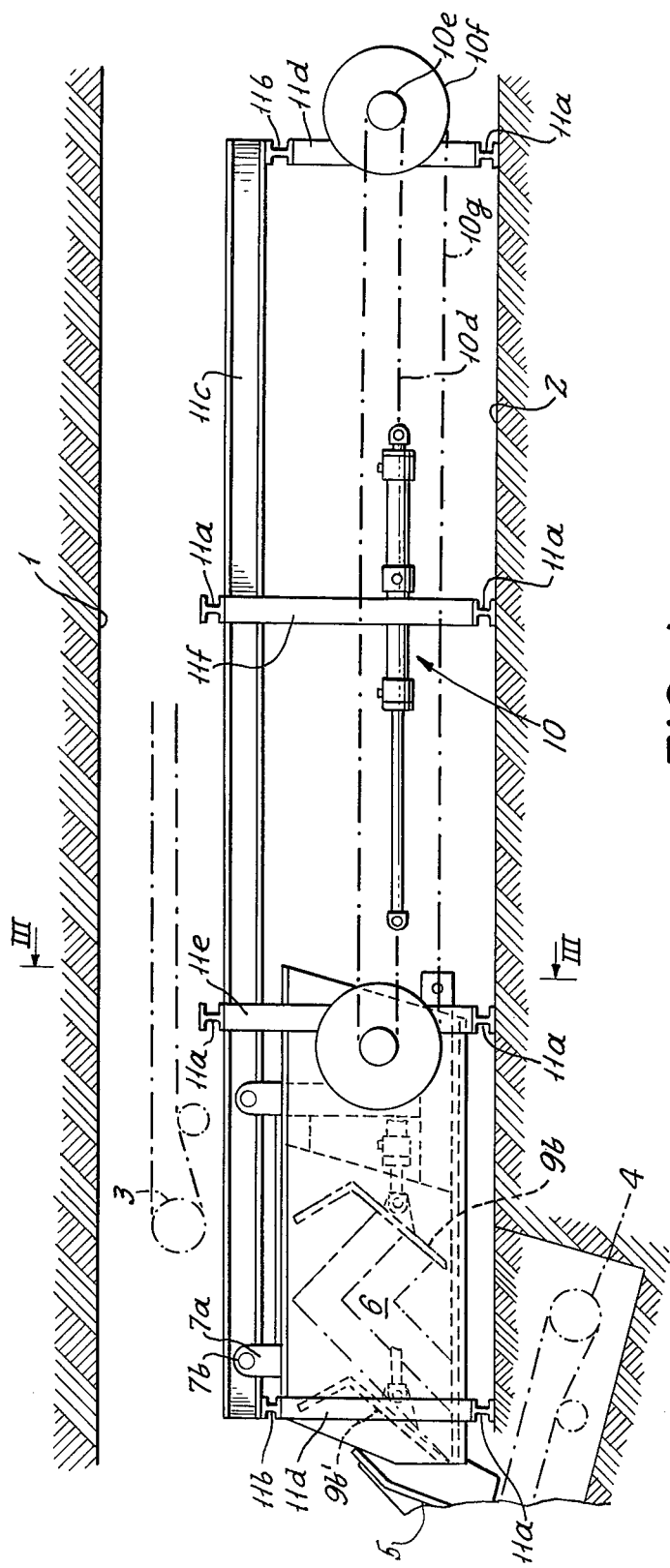
FIG. 1 is a longitudinal side elevation of the extendable bunker in accordance with the present invention showing the container members in their contracted position.
Figure 2:
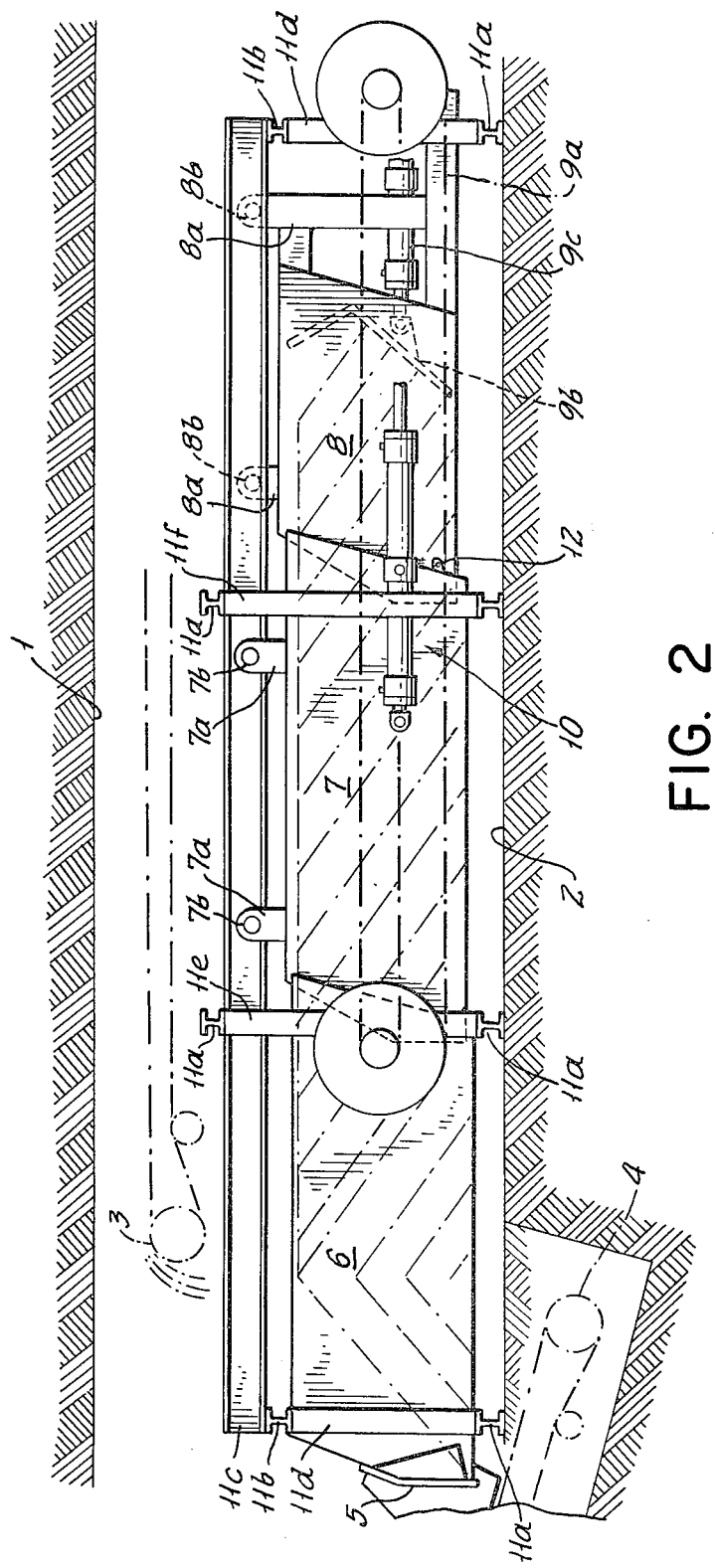
FIG. 2 is a longitudinal side elevation of the assemblage of FIG. 1 showing the container members in their extended position.
Figure 3:
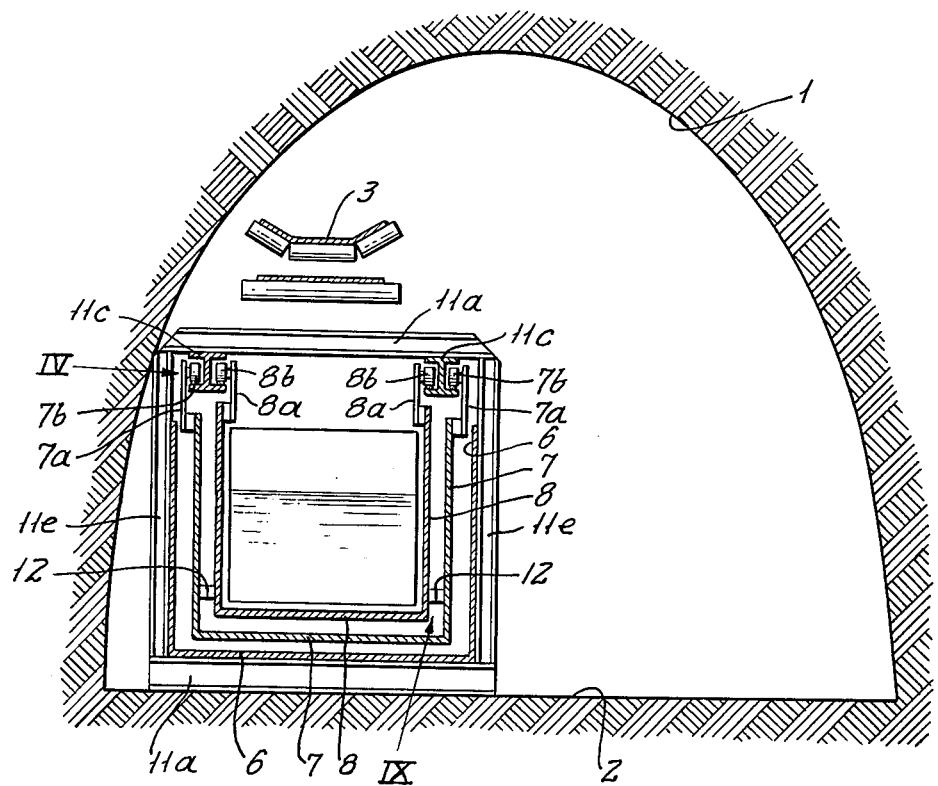
FIG. 3 is a sectional view taken along the line III—III of FIG. 1.

Referring now to the drawings, wherein like reference numerals are used to refer to similar parts throughout the various figures thereof, the apparatus of the present invention is shown particularly in FIGS. 1, 2 and 3, as located within a coal bank, drift or heap 1, 2 from which the bunker of the invention may operate to transport the coal or other bulk material forming the production or yield from the working of the mine or drift. The bulk material is supplied to the extensible bunker of the present invention by means of a belt conveyor 3. The material is hauled away or transported from the extensible bunker of the invention by a second belt conveyor 4.

The basic container assemblage of the present invention is best seen in FIGS. 1 and 2 with an end view of the assemblage being shown in FIG. 3. Essentially, the assemblage of the present invention comprises a plurality of nested telescoping containers which are sized as a graduated series, with each container member being sized to fit into a next larger adjacent container member. The assemblage of the invention includes a stationary container member 6 and a plurality of movable container members such as the container members 7 and 8. As shown in FIG. 1, the container member 8 is nested within the container member 7 and both the container members 7 and 8 are nested inside of the container member 6. With the container members in this position, as shown in FIG. 1, the volume of the bunker of the invention formed by the container members is contracted to its minimum volume.

The container members 7 and 8 may, however, be telescopically removed from within the container member 6, as shown in FIG. 2. In the position shown in FIG. 2, the container member 8 is moved to its fully extended position and the container member 7 is arranged between the stationary container member 6 and the end container member 8.

As best seen in FIG. 3, the size of the container members is such that they fit one within the other in a nested arrangement when they are in the contracted position shown in FIG. 1.

The stationary container member 6 is formed with a head wall having a controllable unloading flap 5 on one side thereof facing in the direction toward the belt conveyor 4 and located to enable discharge of the bulk material from the end wall having the flap 5 onto the conveyor 4.

The movable container member 7 is formed without head walls and the container member 8 is likewise open on one end face thereof toward the container 7. The container member 8 is formed on the side thereof opposite the side adjacent the container member 7 with a movable end wall 9b. As will be explained in greater detail hereinafter, the end wall 9b operates as a pusher member which propels the bulk material out of the container assemblage through the unloading flap 5 of the container member 6.

The bulk material is introduced into the extensible bunker of the present invention by means of a belt conveyor system which conveys the material on to the feed conveyor 3 from which it is deposited into the container assemblage including the container members 6, 7 and 8.

With the container members in their nested position shown in FIG. 1, the innermost movable container member 8 is first filled with the bulk material, as best seen in FIG. 3. After filling of the container member 8, the container members may be moved toward their extended position and the container member 8 is withdrawn outwardly from the container member 6. Thereafter, bulk material flows into the container member 7 which subsequent to the filling process is likewise pulled out of the container member 6 within which it is nested. Lastly, the stationary container member 6 is filled after which the feeding of the bulk material into the container assemblage is completed and the container assemblage is thereby moved to its extended position shown in FIG. 2.

All three of the container members essentially form a self-enclosed bunker space. The overall volume of the bunker assemblage is limited by the head wall of the stationary container member 6, the side walls and bottoms of the container members 6, 7 and 8 and by the movable end wall 9b of the container member 8.

The container assemblage, including the stationary container member 6 and the movable container members 7 and 8 is accommodated within a frame structure identified by the reference numerals 11 and 11a to 11f, as best seen in FIGS. 1, 2, 3, 5, 6 and 7.

Figure 4:
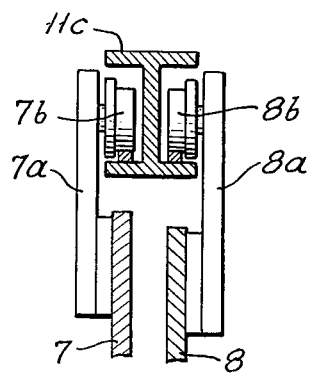
FIG. 4 is an enlarged sectional view showing in greater detail a portion IV of the apparatus of FIG. 3.

The movable container members 7 and 8 move along a track which is formed by longitudinal girders 11c of the frame structure 11. These are suspended for pivotal motion by means of tongues 7a, 8a and are arranged displaceably by means of roller guides 7b, 8b, as best seen in FIGS. 3 and 4.

Figure 5:
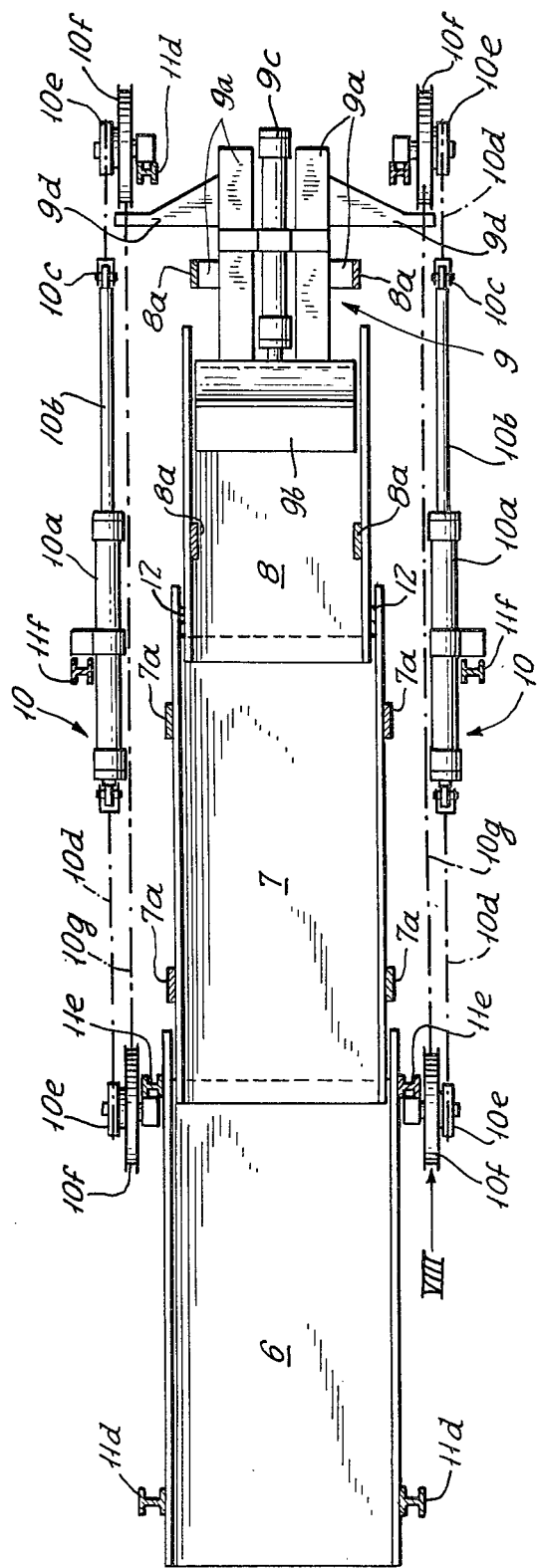
FIG. 5 is a top view of the assembly of the present invention showing the container members in their extended positions.

Discharge of the bulk material occurs by means of a shift or actuation device 9 best seen in FIG. 5, which is secured to the movable container member 8. The device 9 consists of a frame 9a which, like the container member 8, is held and secured upon tongues 8a and pendulum rollers 8b. The frame 9a has fastened thereto the shifting elements 9d which are attached to a shifting device mechanism 10 for displacing the movable container members 7 and 8 along the track defined by the longitudinal girders 11c. A shift member 9c likewise secured upon the frame 9a serves for shifting the wall 9b of the container member 8.

Figure 8:
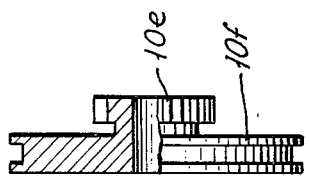
FIG. 8 is a detailed view partially in section looking along the direction of the arrow VIII in FIG. 5.

The drive mechanism 10 is shown in FIGS. 6, 7 and 8 to consist of two hydraulic cylinders 10a each having two pistons 10b with connecting forks 10c at each piston end. Toothed gear chains 10d which run over gear wheels 10e are connected as shown to each piston end by forks 10c. Pulleys 10f are driven by the gears 10e with the pulleys being rigidly connected thereto and cables 10g which wind about the pulleys 10f are moved forwardly and rearwardly along a shift path by the chains 10d through the pulleys 10f. The shift elements 9d of the shift device 9 are fastened upon the cables 10g in a locked engagement and are moved therewith.

The pulleys 10f together with the gear wheels 10e are rotatably supported upon upstanding frame members 11e and 11d, respectively, as shown. As will be seen from the drawings, the pulleys 10f have a larger diameter than the gear wheels 10e.

The hydraulic cylinders 10a of the drive mechanism 10 are supported upon upstanding frame members 11f. In operation, the hydraulic cylinders 10a are actuated to drive the gear wheels 10e either clockwise or counterclockwise depending upon whether contraction or expansion of the bunker is to be effected.

When the bunker is to be contracted, the cylinders 10a are actuated to move the pistons 10b from the positions shown in FIGS. 2, 5 and 6 to the positions shown in FIGS. 1 and 7. Thus, the pistons 10b which are located rearmost, or to the right side of the apparatus, as viewed in the drawings, are retracted or drawn leftwardly into the cylinders 10a pulling the attached gear chains 10d with them and effecting rotation of the gear wheels 10e and pulleys 10f clockwise, as viewed in the drawings. The pistons 10b on the forward or left side of the cylinders 10a are extended and the resultant movement of the gear chains 10d causing rotation of the gearwheels 10e and pulleys 10f will consequently cause movement of the cables 10g, which will be unwound from the rearmost or right-side pulleys 10f and simultaneously wound upon the forwardmost or left-side pulleys 10f.

The pulleys 10f and the gear wheels 10e are sized in diameter to permit the cables 10g to move the shifting elements 9d a distance sufficient to bring the movable containers 7, 8 from the fully extended position of FIGS. 2, 5 and 6 to the contracted position of FIGS. 1 and 7.

Of course, the sequence described above may be reversed simply by reversing the operation of the cylinders 10a and the direction of movement of the pistons 10b.

It will, of course, be understood that the shift device 9 carried by the shifting elements 9d will be moved with the container member 8 in both directions of travel.

Thus, discharge of the bulk material from the bunker assemblage onto the belt conveyor 4 may be simply effected by action of the sliding wall 9b which is actuated by the shift member 9c of the shift device 9 in the direction of the unloading flap 5. During this process the bulk material is propelled from the movable container member 8 and is fed out by displacement of the sliding wall 9b by means of the shift member 9c into the end position 9b', as seen in FIGS. 1 and 7.

Figure 9:
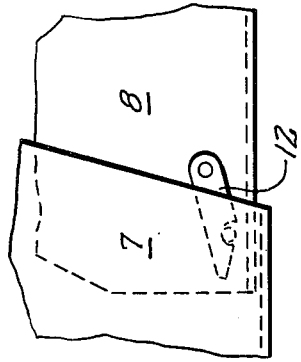
FIG. 9 is a detailed view showing a part of the apparatus as viewed in the direction of the arrow IX in FIG. 3.

Ratchet elements 12 shown in FIGS. 2, 5, 6 and 9 cause the two movable container members 7 and 8 to be separated from each other when they are pushed one into the other by release of the ratchet elements 12 and to be connected with one another when they are being pulled apart by a snapping-in operation. The overlapping bottoms of the container members 7 and 8 thus form a closed surface thereby preventing the formation of trickle, as best seen in FIG. 9.

Figure 10:
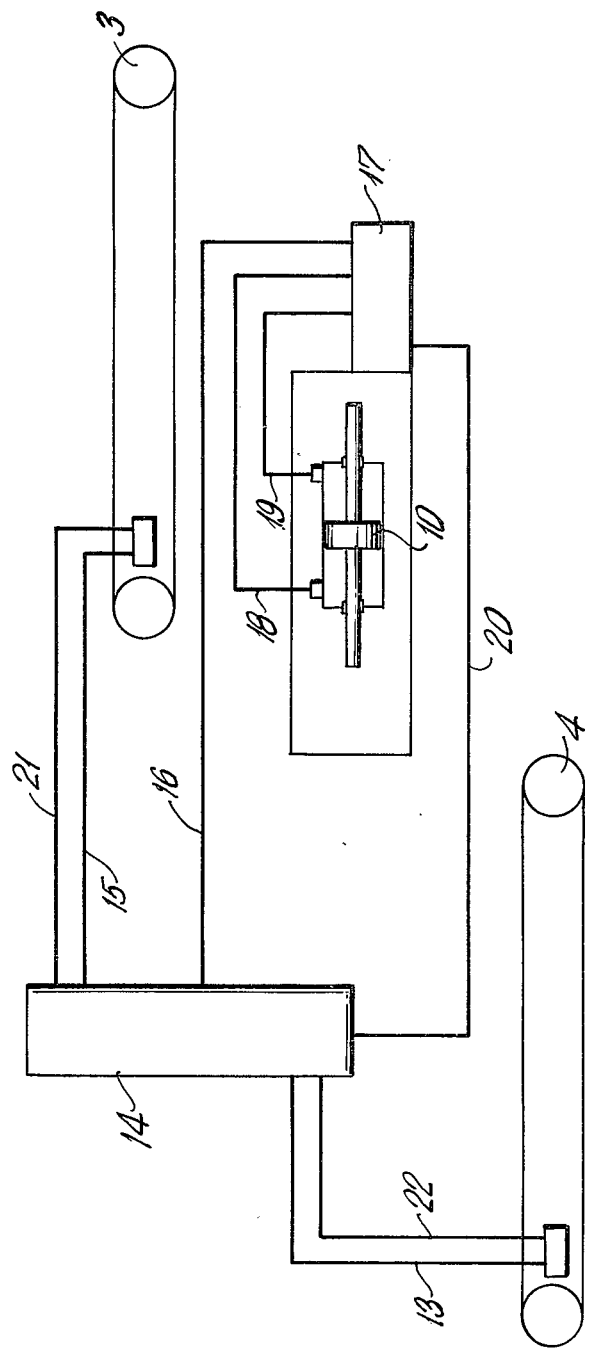
FIG. 10 is a schematic diagram of a control system for effecting automated operation of the device of the present invention.

The control system according to FIG. 10 operates to achieve the function of rendering the flow of material uniform. In the system of FIG. 10, a control circuit 13 for the conveyor 4 is provided for transporting material from the bunker. A regulator or control unit 14 is also provided as is a control circuit 15 of the conveyor 3 for feeding material in the bunker. A control circuit 16 of the drive mechanism 10 is provided and a control device 17 in the drive mechanism 10 is also provided. Furthermore, a control circuit 18 for the receiving function is included as is a control circuit 19 for the discharging function. A control circuit 20 operates for indicating when the coal bunker is full and a control circuit 21 operates to switch the conveyor 3 "on" and "off". A control circuit 22 operates for switching the conveyor 4 "on" and "off".

In accordance with FIG. 10, in the case where the bulk material is being received by the bunker, the control system operates so that the amount of bulk material supplied by the belt conveyor 3 is larger than the amount received by the belt conveyor 4.

The desired quantity is reported from the belt conveyor 4 through the control circuit 13 to the control unit 14. The control unit 14 compares the desired quantity with the actual quantity of the belt conveyor 3, which actual quantity is also reported in the form of a signal to the control unit 14 through control circuit 15.

The control unit 14 effects comparison of the desired and the actual quantities and emits a signal to the control device 17 through the control circuit 17. The control device 17 passes this signal through the control circuit 18 to actuate the drive mechanism 10 to expand the bunker and provide the capacity for excess bulk material to be stored therein.

As a result, the movable container 7, 8 will be pulled apart, the containers 7, 8 being moved by the drive mechanism 10 in the manner previously described.

In accordance with FIG. 10, when the coal bunker is filled to its maximum capacity, a signal is transmitted through the control circuit 20 to control unit 14 thereby producing a signal through control circuit 22 for switching the conveyor 3 "off".

When a situation exists in which the quantity of bulk material supplied by conveyor 3 coincides with the quantity of belt conveyor 4, control 14 confirms that the desired quantity on the belt conveyor 4 and the actual quantity supplied on belt conveyor 3 coincide. Both quantities have been transmitted in the form of signals to control 14 through control circuits 13 and 15.

Through control circuit 16 and the control device 17, the control unit 14 causes the drive mechanism 10 to cease operation and the containers 7, 8 remain in rest positions.

In the case in which the amount of bulk material supplied by the belt conveyor 3 is smaller than the required amount of material to be transported by belt conveyor 4, the control unit 14 compares the signals which are reported through control circuits 13 and 15. The differential quantity determined by control unit 14 is reported in the form of a signal through control circuit 16 to control device 17. Through control circuit 19, the control device 17 causes the drive mechanism 10 to discharge the differential quantity.

As a result, the containers 7, 8 are moved within the frame structure into each other into the contracted position and the bulk material is discharged onto the belt conveyor 4 in the manner previously described.

In the case where the conveyors connected to the belt conveyor 4 are stopped for some reason, an appropriate signal would be given to control unit 14 through control circuit 22. Through the control circuit 21, the control unit 14 operates to stop the belt conveyor 3 by means of an emitted signal and, through control circuit 16 and control device 17, the drive mechanism 10 is caused to be switched "off" and there is thus prevented further discharge of bulk material from the coal bunker.

If, in such a case, the maximum storage capacity of the coal bunker is not utilized, the control circuit 16, the control device 17 and the control circuit 18 cause signals to be emitted whereby more bulk material may be stored in the coal bunker.

The control system in accordance with FIG. 10 is capable of controlling the receiving and discharging of bulk material in all intermediate stages enabling conversion of the device from an exclusively receiving function to an exclusively discharging function.

While specific embodiments of the invention have been shown and described in detail to illustrate the application of the inventive principles, it will be understood that the invention may be embodied otherwise without departing from such principles.

What is claimed is:

1. A bunker assembly for receiving and discharging bulk materials, particularly coal for subsurface mine hauling, comprising: an assemblage of nested telescopic container members, including at least one stationary member and a plurality of movable members, said container members being formed in graduated sizes with each container member being adapted to be fitted into a next larger adjacent container member, said movable members being telescopically movable relative to said stationary member and to each other to expand and contract the volume of said assemblage; means for feeding material into said assemblage and means for discharging material from said assemblage; frame means for fixedly supporting said assemblage within a subsurface mine location; and reversible drive means mounted upon said frame means for effecting reversible telescopic movement of said movable container members to vary the volume of said assemblage, said drive means comprising gear wheel means and pulley means rotatably fixed relative to each other, cable means in driving engagement with said pully means and having said movable container members connected thereto, gear chain means in driving engagement with said gear wheel means to effect rotation thereof, and reversible hydraulic cylinder means having said gear chain means connected thereto and operating to effect reversible rotation of said gear wheel means, said hydraulic cylinder means thereby operating to reversibly drive said movable container members to expand and contract the volume of said assemblage.

2. A bunker assembly according to claim 1 wherein said means for feeding material into said assemblage comprise a first belt conveyor located above said container assemblage and wherein said means for discharging material from said assemblage comprise a second belt conveyor located below said assemblage.

3. A bunker assembly according to claim 1 wherein said plurality of movable container members include an end container member which is located at the furthest position from said stationary member when said movable members are in their fully extended position to fully expand the volume of said assemblage, and wherein said stationary container member includes an unloading flap through which bulk material may be discharged from said assemblage, said assemblage further including discharge means for propelling bulk material within said assemblage toward said stationary container member and through said unloading flap when said container members are telescopically moved toward a retracted position.

4. A bunker assembly according to claim 3 wherein said discharge means comprise a discharge member constructed to form a movable end wall of said end container member and wherein said drive means include means for actuating said discharge member to push said bulk material out of said container assemblage.

5. A bunker assembly according to claim 4 including control means for driving said first and second belt conveyors, said unloading flap and said drive means in a mutually controlled manner.

6. Apparatus according to claim 1 wherein said frame means comprise a frame structure having said stationary container member and said movable container members accommodated thereon and suspended therefrom by pivotal mounting means, said assembly further including roller guides enabling guided displacement of said movable container members upon said frame structure.

7. A bunker assembly according to claim 1 further including ratchet means operatively interposed between said container members and operating to enable said container members to be drivingly detached from each other when said members are being moved relative to one another in a direction toward contraction of the volume of said assemblage, said ratchet means operating to cause interengagement between adjacent container members when said movable container members are being drawn to expand the volume of said assemblage, said ratchet means operating to enable said movable container members upon movement thereof relative to said stationary container members to be insertable and extractable therefrom in telescopic fashion.

8. A bunker assembly according to claim 1 including slide rails on said frame means and rollers operatively engaged with said movable containers to enable guided movement of said containers along said slide rails.

9. A bunker assembly according to claim 1 wherein said movable container members are mounted to be nested into and withdrawn from said stationary container member.

10. A bunker assembly according to claim 1 wherein said gear wheel means and said pulley means are formed with different diameters, with the ratio between said diameters determining the ratio of linear movement between said hydraulic cylinder means and said movable container members.

11. A bunker assembly according to claim 1, wherein said gear wheel means are formed with a smaller diameter than said pulley means and wherein, for a given distance travelled by said gear chain means, said cable means are driven through a proportionately greater distance dependent upon the ratio between the diameters of said gear wheel means and pulley means.

* * * * *